United States Patent Office
3,767,644
Patented Oct. 23, 1973

3,767,644
PROCESS FOR THE PREPARATION OF N-ALKYL SUBSTITUTED LACTAMS
Yohei Fukuoka and Katsuyoshi Sasaki, Tokyo, Japan, assignors to Asahi Kasei Kogyo Kabushiki Kaisha, Osaka City, Osaka, Japan
No Drawing. Filed Dec. 27, 1971, Ser. No. 212,622
Claims priority, application Japan, Dec. 30, 1970, 46/123,095
Int. Cl. C07d 41/06
U.S. Cl. 260—239.3 A         6 Claims

ABSTRACT OF THE DISCLOSURE

An improved process for the preperation of N-alkyl substituted lactams useful as solvents by heating a cyanhydrin represented by the formula $HO(CH_2)_nCN$ wherein $n$ is an integer of 3 to 5 inclusive together with an alcohol represented by the formula ROH wherein R represents an alkyl group having 1 to 4 carbon atoms at a temperature of 250° C. to 400° C. under pressure. The present process gives an improved yield of the desired product at a low cost as compared with the prior art process. The process can be advantageously modified. One modification consists in the process in which the reaction is conducted in the process of a specific catalyst. Another modification consists in the process in which as least a part of the by-products are recycled in the reaction system. Still another modification consists in the process in which the reaction is conducted in the presence of water, the water being added at the time of initiation of the reaction. Such modifications give a further improved yield of the desired product.

---

This invention relates to a process for the preparation of N-alkyl substituted lactams.

More particularly, this invention is concerned with a new process for the preperation of an N-alkyl substituted lactam starting from a cyanhydrin and an alcohol.

Still more particularly, this invention is concerned with a new and improved process for the preparation of an N-alkyl substituted lactam which comprises heating a cyanhydrin represented by the formula $$HO(CH_2)_nCN$$

wherein $n$ is an integer of 3 to 5, inclusive, together with and alcohol represented by the formula $$ROH$$

wherein R represents an alkyl group having 1 to 4 carbon atoms at a temperature ranging from 250° C. to 400° C. under pressure.

N-alkyl substituted lactams are industrially important and useful solvents and examples of these lactams include N-methylpyrrolidone and N-methylpiperidone. It has been earnestly desired in the art to develop a new and commercially inexpensive process for preparing the same.

Heretofore, it has been proposed to prepare the N-alkyl substituted lactams by starting from a cyanhydrin and an alkylamine (see U.S. Pat. No. 3,103,509). This prior art process is known as a useful process for the preparation of N-alkyl substituted lactams since the desired N-alkyl substituted lactam can be produced from the cyanhydrin and the alkylamine only in one stage. However, this process has some drawbacks to be improved or overcome. Stated illustratively, the alkylamines employed as one of the starting materials in such prior art process are relatively expensive and thus, the N-alkyl substituted lactams so produced are, of course, of a considerably high cost.

As a result of our extensive studies to find out a new process for the preperation of an N-alkyl substituted lactam which is more advantageous and useful from the commercial point of view, it has been found that N-alkyl substituted lactams can be prepared by reacting a cyanhydrin and an alcohol. The alcohols to be employed in this invention are extremely inexpensive as compared with the alkylamines which are employed for reacting with the cyanhydrin to produce the desired lactam in the prior art process. It is to be noted that in this invention the cyanhydrin serves also as a nitrogen source for the desired lactam, that is, the nitrogen atom of the cyano group in the cyanhydrin is effectively utilized for constituting the nitrogen atom in the lactam produced. It is further to be noted that the process of this invention can be easily conducted.

It is, accordingly, a primary object of this invention to provide a new and commercially available process for the preparation of an N-alkyl substituted lactam.

Other objects and advantages of this invention will become apparent to those skilled in the art from the following description.

The cyanhydrins which may be employed in the process of this invention are represented by the general formula $$HO(CH_2)_nCN$$

wherein $n$ is an integer of 3 to 5 inclusive. Examples of the cyanhydrins include trimethylene cyanhydrin, pentamethylene cyanhydrin and the like.

The alcohols which may be employed in the process of this invention are represented by the general formula $$ROH$$

wherein R represents an alkyl group having 1 to 4 carbon atoms. Examples of the alcohols include methanol, ethanol, n-propanol, isopropanol, n-butanol and the like.

In carrying out the process of this invention, the alcohol and the cyanhydrin may be employed from the beginning of the reaction in the full amount required for the desired reaction, or may be successively or stepwise supplied during the course of the reaction. The alcohol may be preferably amployed in an amount of 0.9 to 5 moles per mole of the cyanhydrin. Too small an amount of the alcohol results in a residue of a large amount of the unreacted-remaining raw materials, while too large an amount of the alcohol accelerates side reactions and, at the same time, decreases the rate of reaction. It is more preferable to employ the alcohol in an amount of 1 to 2 moles per mole of the cyanhydrin employed.

The reaction temperature in the process of this invention is critical and should be within the range of 250° C. to 400° C. A lower temperature tends to decrease the rate of reaction, while a higher temperature promotes unfavorable side reactions. The most preferable temperature range is of 280° C. to 340° C.

In one embodiment of the process of this invention, the reaction may be effected in the presence of a catalsyt, which is contemplated to be included within the purview of this invention. The catalyst is suitably a member selected from the group consisting of the halides of copper-group elements, the halides of zinc-group elements, the halides of iron-group elements and mixtures thereof. Employment of such a catalyst can promote the reaction rate and effectively depress side reactions. Representative examples of these halides which may be employed in the process of this invention include cuprous chloride, cupric chloride, cuprous bromide, cupric iodide, cupric fluoride, silver chloride, silver iodide, silver (II) bromide, zinc chloride, cadmium chloride, mercurous chloride, mercuric bromide, ferrous chloride, ferric chloride, ferric bromide, cobalt chloride, cobalt fluoride, cobalt iodide, nickel chloride and the like.

The catalyst may be employed in the reaction in the form as dissolved or suspended in the reaction mixture and also effectively in the form as supported by a carrier such as silica gel or alumina. The amount of the catalyst to be employed may usually and suitably be in the range of 0.01 to 10 mole percent with respect to the starting cyanhydrin, since too small an amount of the catalyst results in decrease of the reaction rate and, at the same time, promotes side reactions while too large an amount thereof does not bring a further advantage. In case the catalyst is supported, for example, by silica gel and is employed in a flow system, the amount thereof is not so strictly limited.

In another embodiment of the process of this invention which may be considered more commercially advantageous, the reaction as mentioned above may be effected by recycling all or a part of by-products of the reaction to the reaction system. Representative examples of the by-products include those compounds represented by the following formulae:

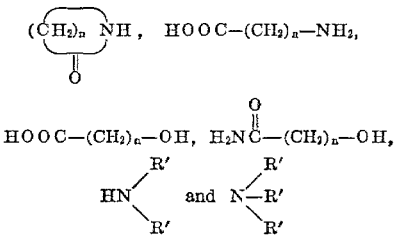

In the above formulae, $n$ is as defined before and R' is an alkyl group having 1 to 4 carbon atoms. It is believed that some of the above-illustrated by-products, for example, the compound of the formula

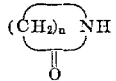

is possibly reacted with the alcohol to give the desired N-alkyl substituted lactam. The separation of such by-products and the recyling of the thus separated by-products to the reaction system may somewhat increase a yield of the desired product, namely, N-alkyl substituted lactams. On the other hand, some other by-products are hardly considered to produce the desired N-alkyl substituted lactams. Examples of such by-products are those represented by the formulae

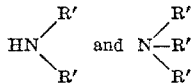

Unexpectedly, however, recycling of a mixture of these by-products without isolation of individual by-products as set forth above has been found to have remarkably favourable effects on the process of this invention. In other words, by such recycling the amount of the by-products is almost not increased any more and a high yield of the desired product can be attained, and thus a commercially available process has been established. Additional advantages of this embodiment consists in increased solubility of the catalyst and accelerated rate of reaction as well as easy separation of the mixture of the by-products from the desired N-alkyl substituted lactam owing to a large difference in boiling point therebetween. Thus, this embodiment does constitute one of the commercially advantageous procedures in the present process.

Still another embodiment of the process of this invention consists in that the reaction is effected in the presence of water, the water being added at the time of initiation of the reaction. The amount of the water to be present is preferably within the range of 0.5 to 20 moles, more preferably within the range of 0.8 to 4 moles per mole of the cyanhydrin employed. Too small an amount of water does not exert any advantageous effect, while too large an amount of water does adversely affect the reaction. It is to be noted that the presence of water can remarkably reduce the coloring of the reaction mixture, which leads to easy separation and purification; and can also accelerate the rate of reaction and depress side reactions, which leads to improvement in a yield of the desired N-alkyl substituted lactam.

The following examples are given for the purpose of illustrating of this invention, but they are not intended to limit the scope thereof.

EXAMPLE 1

Into an induction revolution stirring type autoclave (hereinafter referred to as an autoclave) having a capacity of 300 ml. were charged 85.1 g. of trimethylene cyanhydrin, 35.2 g. of methanol and 6.0 g. of mercuric chloride. After replacing the air in the autoclave by nitrogen gas, the reaction was effected by heating with stirring at 300° C. for 2 hours. After cooling to room temperature, the autoclave was opened and the resulting reaction mixture was distilled under reduced pressure to give 35.5 g. of N-methyl-2-pyrrolidone (yield: 35.9% with respect to the trimethylene cyanhydrin), which has a boiling point of 56–59° C./6 mm. Hg and an absorption band of an amide group at $\gamma$ max. 1640 cm.$^{-1}$ in its infrared spectrum.

*Analysis.*—Calculated (percent): C, 60.58; H, 9.15; N, 14.13. Found (percent): C, 60.87; H, 9.31; N, 14.01.

EXAMPLE 2

The same procedure as shown in the above Example 1 was repeated except that 85.1 g. of trimethylene cyanhydrin, 35.2 g. of methanol, 18.0 g. of water and 4.0 g. of cobalt chloride as a catalyst were employed and the reaction was effected by heating with stirring at 320° C. for 1 hour. The resulting reaction mixture was distilled to obtain 41.1 g. of N-methyl-2-pyrrolidone (yield: 41.5% with respect to the trimethylene cyanhydrin).

EXAMPLE 3

The same procedure as shown in the above Example 2 was repeated except that 85.1 g. of trimethylene cyanhydrin, 35.2 g. of methanol and 18.0 g. of water were employed. There were obtained 30.5 g. of N-methyl-2-pyrrolidone (yield: 30.8% with respect to the trimethylene cyanhydrin).

EXAMPLE 4

Into an autoclave having a capacity of 20 ml. were charged 8.5 g. of trimethylene cyanhydrin, 4.2 g. of methanol, 1.0 g. of water and 5 mole percent of each of the indicated catalysts with respect to the cyanhydrin. After replacing the air in the autoclave by nitrogen gas, the reaction was effected by heating at 350° C. for 1 hour, while shaking in a thermostat type oil bath. The yields of the N-methyl-2-pyrrolidone thus obtained are shown together with the catalyst in the following Table I, in which those yields obtained in the absence of water are also shown.

TABLE I

| Catalyst | Yield, g., in the— | |
| --- | --- | --- |
| | Presence of water | Absence of water |
| None | 3.3 | 3.0 |
| Cuprous chloride | 4.2 | 3.5 |
| Silver iodide | 4.1 | 3.9 |
| Ferric chloride | 4.5 | 4.0 |
| Cobalt chloride | 4.3 | 3.8 |
| Nickel chloride | 4.0 | 3.9 |
| Cadmium bromide | 4.3 | 3.5 |
| Cadmium iodide | 4.2 | 3.5 |
| Zinc bromide | 4.6 | 4.2 |

EXAMPLE 5

Into an autoclave having a capacity of 20 ml. were charged 8.5 g. of trimethylene cyanhydrin, 3.2 g. of methanol, 0.9 g. of water and 2 mole percent of each of the indicated catalysts with respect to the trimethylene cyanhydrin. Then, the reaction was effected by heating with stirring at 280° C. for 4 hours. The yields of the N-methyl-2-pyrrolidone thus obtained are shown together with the catalyst in the following Table II.

TABLE II

| Catalyst: | Yield, g. |
|---|---|
| None | 3.2 |
| Cupric chloride | 4.2 |
| Cupric bromide | 4.1 |
| Ferric chloride | 4.3 |
| Cobalt chloride | 4.0 |
| Cobalt bromide | 4.1 |
| Zinc chloride | 5.0 |

EXAMPLE 6

Into an autoclave having a capacity of 200 ml. were charged 99.1 g. of tetramethylene cyanhydrin, 35.2 g. of methanol and 2.3 g. of zinc chloride. After replacing the air in the autoclave by nitrogen gas, the reaction was effected by heating with stirring at 320° C. for 2 hours. The resulting reaction mixture was distilled to give 43.5 g. of N-methylpyrrolidone (yield: 38.4% with respect to the tetramethylene cyanhydrin), which has a boiling point of 93–96° C./2 mm. Hg and an absorption band of an amide group at $\gamma$ max. 1640 cm.$^{-1}$ in its infrared spectrum.

*Analysis.*—Calculated (percent): C, 63.68; H, 9.80; N, 12.39. Found (percent): C, 63.55; H, 9.58; N, 12.46.

EXAMPLE 7

Into an autoclave having a capacity of 500 ml. were charged 113.2 g. of pentamethylene cyanhydrin, 35.2 g. of methanol and 4.0 g. of cupric chloride. After replacing the air in the autoclave by nitrogen gas, the reaction was effected by heating with stirring at 340° C. for 1.5 hours. Thereafter, the autoclave was opened, and small amounts of fractions having low boiling points were removed under atmospheric pressure. The residue was subjected to distillation under reduced pressure to give 55.3 g. (yield: 43.5% with respect to the pentamethylene cyanhydrin) of N-methylcaprolactam, which has an absorption band of an amide group at $\gamma$ max. 1640 cm.$^{-1}$ in its infrared spectrum.

*Analysis.*—Calculated (percent): C, 63.38; H, 9.80; N, 12.39. Found (percent): C, 63.82; H, 9.85; N, 12.30.

EXAMPLE 8

Into an autoclave having a capacity of 100 ml. were charged 8.5 g. of trimethylene cyanhydrin, 3.2 g. of methanol and 9.0 g. of water together with each of the catalysts indicated. The resulting mixture was heated at 360° C. with stirring for 30 minutes. The results are summarized in the following Table III in which the amount of the catalyst added is also shown in terms of mole percent with respect to the trimethylene cyanhydrin employed.

| Catalyst | Amount of catalyst | Yield, g. |
|---|---|---|
| Cuprous chloride | 1.0 | 4.5 |
| Silver chloride | 1.0 | |
| Cobalt chloride | 1.0 | 5.0 |
| Ferric chloride | 0.5 | |
| Mercuric chloride | 0.3 | 4.3 |
| Nickel chloride | 2.0 | |
| Ferrous chloride | 1.0 | 4.8 |
| Silver (II) bromide | 1.0 | |

EXAMPLE 9

Into an autoclave having a capacity of 200 ml. were charged 85.1 g. of trimethylene cyanhydrin, 35.2 g. of methanol and 2.7 g. of zinc chloride. After replacing the air in the autoclave by nitrogen gas, the reaction was effected by heating with stirring at 350° C. for 1 hour. After cooling to room temperature, the autoclave was opened and fractions having low boiling points were removed from the resulting mixture under atmospheric pressure. The residue so obtained was subjected to distillation under reduced pressure to give 37.5 g. of N-methyl-2-pyrrolidone (yield: 37.9% with respect to the trimethylene cyanhydrin), which has a boiling point of 83–85° C./14 mm. Hg. The distillation was discontinued. To 65.5 g. of the residue so obtained were added 85.1 g. of trimethylene cyanhydrin and 35.2 g. of methanol. The resulting mixture was again charged into the above-mentioned autoclave and then the reaction was effected by heating with stirring at 350° C. for 1 hour. Thereafter, fractions having low boiling points were removed from the reaction mixture under atmospheric pressure, and then the residue was subjected to distillation under reduced pressure to give 60.5 g. of N-methyl-2-pyrrolidone (yield: 61.1% with respect to the trimethylene cyanhydrin).

EXAMPLE 10

The same procedure as shown in the above Example 1 was repeated except that 85.1 g. of trimethylene cyanhydrin, 41.7 g. of methanol, 18.0 g. of water and 3.5 g. of cobalt chloride were charged and the reaction was effected by heating with stirring at 320° C. for 2 hours to give 40.1 g. (yield: 40.4% with respect to the trimethylene cyanhydrin) of N-methyl-2-pyrrolidone as the product. As by-products were also obtained 16.2 g. of fractions having low boiling points (the main components of which were the residual methanol and the by-product trimethylamine) and 65.8 g. of the distillation residue (containing about 15% of 2-pyrrolidone with respect to the starting trimethylene cyanhydrin) after distilling off the N-methyl-2-pyrrolidone and removing water.

To the fractions having low boiling points and distillation residue thus obtained were added 85.1 g. of trimethylene cyanhydrin, 41.7 g. of methanol and 18.0 g. of water, and the reaction was again effected by heating with stirring at 320° C. for 2 hours to give 83.5 g. of N-methyl-2-pyrrolidone (yield: 84.1% with respect to the trimethylene cyanhydrin) as the product. The amount of the by-products was 86.5 g.

EXAMPLE 11

A mixture of 85.1 g. of trimethylene cyanhydrin, 32.0 g. of methanol, 18.0 g. of water and 3.0 g. of ferric chloride was continuously fed into a reaction tube made of stainless steel and having an inner diameter of 5 mm., a length of 10 m. and an inner capacity of 200 ml., said tube being dipped in a salt bath (sodium nitrite and potassium nitrate of a weight ratio of 1:1) maintained at 340° C. The reaction system was kept under a sufficient pressure to maintain the reaction mixture in a liquid phase during the reaction. The reaction mixture was fed at a rate of 6.6 ml./min. and the reaction mixture which passed through the reaction tube was immediately cooled and drawn out. 550 g. of the reaction mixture thus produced were separated by distillation to give 72.5 g. of fractions having low boiling points (the main components of which were water, methanol and the by-product trimethylamine) and, after the removal of water, 157.0 g. of N-methyl-2-pyrrolidone (yield: 43.0% with respect to the trimethylene cyanhydrin) as the product. In this instance, no starting materials remained and 183.0 g. of the distillation residue (the main component of which was 2-pyrrolidone) were obtained.

The fractions having low boiling points and the distillation residue obtained as above were combined into a mixture. To the resulting mixture were added 127.5 g. of trimethylene cyanhydrin and 48.0 g. of methanol to form a uniform solution. The solution was then fed into the reaction tube and the reaction was effected in the same manner as set forth above. The reaction mixture thus obtained was subjected to distillation to give 132.0 g. of N-methyl-2-pyrrolidone (yield: 88.9% with respect to the trimethylene cyanhydrin).

EXAMPLE 12

The same procedure as shown in the above Example 1 was repeated except that 85.1 g. of trimethylene cyanhydrin, 74.0 g. of n-butyl alcohol, 18.0 g. of water and 4.5 g. of ferrous chloride as a catalyst were employed and the reaction was effected by heating, with stirring, at 390° C. for 40 minutes. The reaction mixture thus obtained was distilled to give 59.2 g. of N-n-butyl-2-pyrrolidone (yield: 42.0% with respect to the trimethylene cyanhydrin).

EXAMPLE 13

The same procedure as shown in the above Example 1 was repeated except that 85.1 g. of trimethylene cyanhydrin, 34.0 g. of methanol, 10.0 g. of water and 5.0 g. of zinc chloride as a catalyst were employed and the reaction was effected by heating, with stirring, at 260° C. for 12 hours. The reaction mixture thus obtained was distilled to give 26.5 g. of N-methyl-2-pyrrolidone (yield: 26.8% with respect to the trimethylene cyanhydrin).

What is claimed is:

1. A process for the preparation of an N-alkyl substituted lactam which comprises heating a cyanhydrin represented by the formula $$HO(CH_2)_nCN$$

wherein $n$ is an integer of 3 to 5, inclusive, together with an alcohol represented by the formula $$ROH$$

wherein R represents an alkyl group having 1 to 4 carbon atoms at a temperature of 250° C. to 400° C. under autogeneous pressure and wherein the alcohol is employed in an amount of from 0.9 to 5 moles per mole of the cyanohydrin.

2. A process as claimed in claim 1, wherein said heating is effected in the presence of from 0.01 to 10 moles per mole of the cyanohydrin, as a catalyst, of a member selected from the group consisting of the halides of copper-group elements, the halides of zinc-group elements, the halides of iron-group elements and mixtures thereof.

3. A process as claimed in claim 2, wherein the halides of copper-group elements, the halides of zinc-group elements and the halides of iron-group elements are cuprous chloride, cupric chloride, cuprous bromide, cupric iodide, cupric fluoride, silver chloride, silver iodide and silver (II) bromide; zinc chloride, cadmium chloride, mercurous chloride and mercuric bromide; and ferrous chloride, ferric chloride, ferrous bromide, ferric bromide, cobalt chloride, cobalt fluoride, cobalt iodide and nickel chloride; respectively.

4. A process as claimed in claim 1, wherein at least a part of any by-products formed is recycled to the starting reaction mixture.

5. A process as claimed in claim 1, wherein said heating is effected in the presence of water, the water being added at the time of initiation of the reaction.

6. A process as claimed in claim 5, wherein the water is employed in an amount of 0.5 to 20 moles per mole of the cyanhydrin.

References Cited

FOREIGN PATENTS 1,192,208    5/1965    Germany _____ 260—239.3 A

HENRY R. JILES, Primary Examiner

R. T. BOND, Assistant Examiner

U.S. Cl. X.R.

260—239.3 R, 293.86, 326.5 FL